(No Model.) 2 Sheets—Sheet 1.
E. G. LATTA.
VELOCIPEDE.
No. 323,162. Patented July 28, 1885.
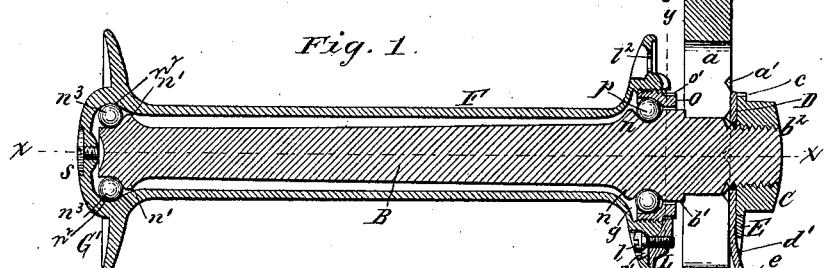
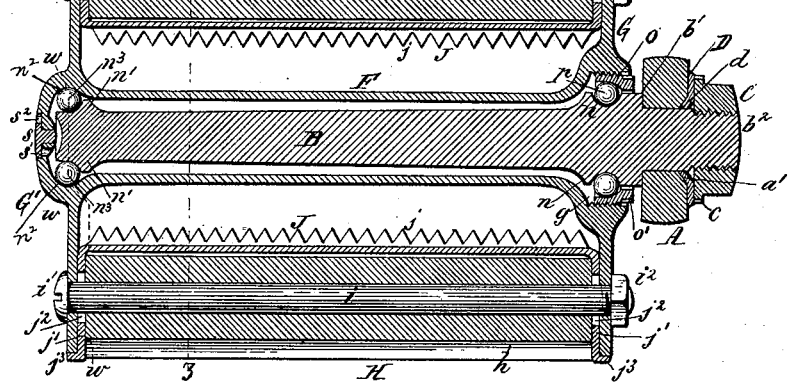
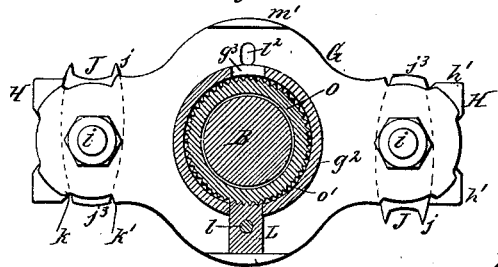
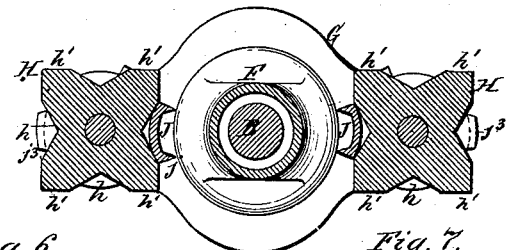
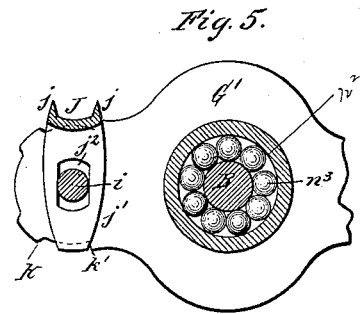
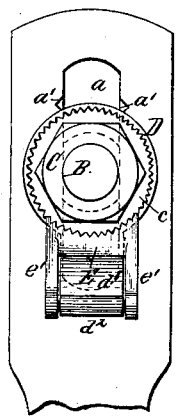
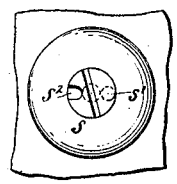
Witnesses: Theo. L. Popp. Chas. J. Buchheit.
E. G. Latta, Inventor.
By Wilhelm & Bonner, Attorneys.
N. PETERS, Photo-Lithographer, Washington, D. C.

(No Model.)　　　　　　E. G. LATTA.　　　2 Sheets—Sheet 2.
VELOCIPEDE.

No. 323,162.　　　　　　　Patented July 28, 1885.

UNITED STATES PATENT OFFICE.

EMMIT G. LATTA, OF FRIENDSHIP, NEW YORK, ASSIGNOR TO THE POPE MANUFACTURING COMPANY, OF HARTFORD, CONNECTICUT.

VELOCIPEDE.

SPECIFICATION forming part of Letters Patent No. 323,162, dated July 28, 1885.

Application filed September 6, 1884. (No model.)

*To all whom it may concern:*

Be it known that I, EMMIT G. LATTA, of Friendship, in the county of Allegany and State of New York, have invented new and useful Improvements in Velocipedes, of which the following is a specification.

This invention relates to certain improvements in the construction of the pedals of velocipedes or bicycles, and more particularly to that class of pedals in which a serrated steel bar is combined with the rubber pedal-bar in such manner that the pedal can be changed from a rubber pedal to a serrated or "rat-trap" pedal, as may be desired.

The object of my invention is to combine a pedal-bar of this character in a compact form and in a simple manner, whereby the pedal can be readily changed from a rubber to a serrated or rat-trap pedal, or a rubber and rat-trap pedal combined, and to so construct the parts whereby the pedal-bars are more elastic and yielding to the foot than those now in use, and whereby the bearing-surfaces are increased and the weight of the bars reduced at the same time; also, to so construct the pedal-shaft and frame whereby the parts are very compact and dust-proof, and whereby the bearings can be easily oiled; also, to construct the ball-bearings in such manner that they can be readily adjusted and the length of the pedal reduced, and whereby the means employed for adjusting the bearings also acts as a balance for the pedal and enables either side of the pedals to remain uppermost, as may be desired; also, in the manner of securing the pedal to the crank.

My invention consists to these ends of the improvements which will be hereinafter fully set forth, and pointed out in the claims.

Figure 10:
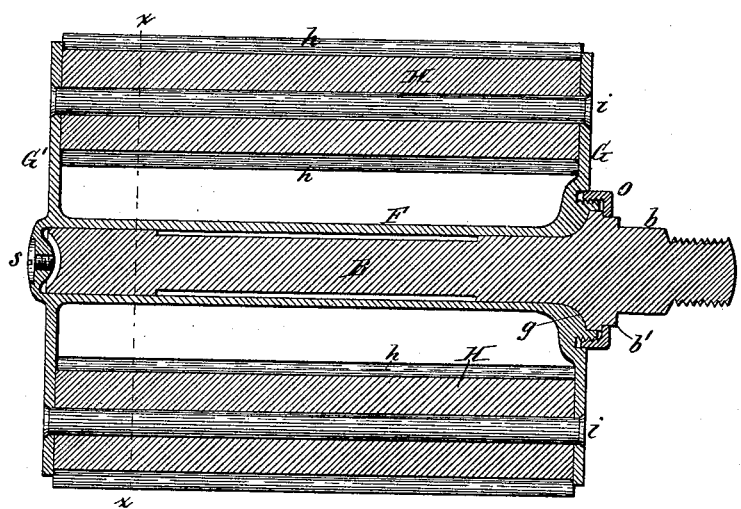
Figure 11:
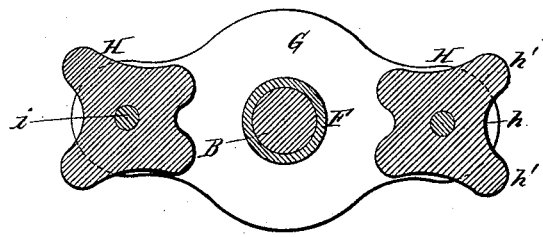

In the accompanying drawings, consisting of two sheets, Figure 1 is a sectional elevation of a pedal provided with my improvements. Fig. 2 is a horizontal section of the same in line $x x$, Fig. 1. Fig. 3 is a cross-section in line $z z$, Fig. 2, looking toward the left. Fig. 4 is a cross-section in line $y y$, Fig. 1, showing the serrated bar turned upward on the front pedal-bar and downward on the rear pedal-bar. Fig. 5 is a cross-section in line $w w$, Fig. 2, the serrated bar being turned upward, as shown in Fig. 4. Fig. 6 is an inside elevation of the crank. Fig. 7 is an elevation of the central portion of the pedal. Fig. 8 is a perspective view of the washer, forming a part of the locking device for securing the pedal to the crank. Fig. 9 is a perspective view of the nut-lock. Fig. 10 is a sectional elevation of a plain bearing pedal provided with a modified form of pedal-bar. Fig. 11 is a cross-section of the same in line $x x$, Fig. 10.

Like letters of reference refer to like parts in the several figures.

A represents the crank, which is provided, near its outer end, with an elongated slot, $a$.

B represents the pedal-shaft, which is provided, near its inner end, with a flattened portion, $b$, adapted to fit in the slot $a$ of the crank, and a shoulder, $b'$, which bears against the outer face of the crank. The inner end of the pedal-shaft is provided with a screw-thread, $b^2$, over which engages a screw-nut, C, whereby the pedal-shaft is secured to the crank.

D represents a washer arranged on the pedal-shaft between the nut C and the inner face of the crank. The washer D is provided on opposite sides of its opening with studs or projections $d$, which engage in notches $a'$, formed in the crank along the inner edges of the slot $a$, whereby the washer is prevented from turning on tightening the nut C. The notches $a'$ are preferably arranged at equal distances apart upon both cranks, and serve as a guide whereby both pedals can be set alike or at the same distance from the crank pin or axle. The washer D is preferably formed of sheet-steel and stamped out with a die, and the studs or projections $d$ are formed by depressing the opposite side of the washer, as shown in Fig. 2. The washer D is provided with a spring arm or shank $d'$, which extends downwardly from the lower edge of the washer, and is curved at its lower end, so as to form a slotted recess or hook, $d^2$.

E represents a nut-lock, which is hinged to the spring-arm $d'$ by the cross-bar $e$, engaging in the hook or recess $d^2$. The lock E is provided with two downwardly-projecting side bars, $e' e'$, which are connected at their lower ends with the cross-bar $e$. The upper face of the lock E is concaved to fit snugly against the lower edge of a rim or flange, c, formed on the nut C. The flange c is provided with a serrated or milled edge, and the concaved face of the lock E is also milled to correspond with the flange c. By engaging the milled concave face against the milled edge of the flange c, the nut C is firmly held from turning. The side bars, $e'$, are made flat on their inner sides, and are held against the face of the crank by the spring-arm $d'$. The lower edges, $e^2$, of the side bars are straight, so that when the lock is moved outward to free the nut the edges $e^2$ will bear against the face of the crank by the action of the spring and hold the lock in an open position and allow the nut C to be loosened or tightened. When the nut C has been tightened in its place, the lock is turned on its hinge $e$, so that its milled upper edge will engage with the milled edge of the flange on the nut and prevent any further movement of the nut on the shaft.

F represents the pedal-sleeve, which incloses the shaft B, and G G' are the end plates of the pedal, which are preferably made in one piece with the sleeve F. The inner plate, G, is provided with a central opening, $g$, through which the pedal-shaft is inserted in the sleeve F, and the outer plate, G', is made solid, so as to cover the outer end of the pedal-shaft, which effectually prevents any dust from getting into the cones or oil from dripping out of the pedal at the outer end.

H H represent the rubber pedal-bars, which are arranged on opposite sides of the sleeve F and between the end plates, G G'. The bars H are secured to the end plates, G G', by rods $i$, which extend centrally through the pedal-bars H and through openings formed in the end plates. The rods $i$ are preferably provided with a slotted head, $i'$, and a screw-thread and nut, $i^2$, at their opposite ends, whereby the pedal-bars can be tightly clamped between the end plates and prevented from turning on the rods $i$, if desired. The pedal-bars H are four-sided in cross-section, as shown in Fig. 4, and each of the four sides is provided with a central longitudinal groove or notch, $h$, whereby two bearing-faces, $h'$ $h'$, are formed on each side or face of the bar. By this construction of the bars H the foot of the rider rests on the edges $h'$ $h'$ on opposite sides of the rod $i$, instead of directly over the rods, and an open space is formed between the foot and the bar over the rod $i$. Double the bearing-surface is thus formed for the foot of the rider on each side of the pedal-bar, and by bearing on opposite edges of the bar the rubber is compressed at its edges first, and caused to stretch the center or grooved portion of the rubber over the rod $i$ when a greater pressure is applied. A rubber bar constructed with the two bearing-faces $h'$ $h'$ on each of its four sides forms a more elastic bar than one in which the pressure is applied directly over the rod, as is the case when the bars are round, square, or triangular in cross-section, and is therefore easier to the feet of the rider, and the feet are less liable to slip off the bar.

J represents the serrated steel pedal-bars, which are arranged on one of the four sides of the rubber bars H. The bars J are preferably formed of a strip of sheet-steel, the edges or sides of which are turned up at right angles to the body of the strip and provided with teeth or serrations $j$. The serrated steel bars or "rat-trap" bars, as they are termed, are designed to be used in wet weather, or for racing purposes, where a firmer hold of the foot to the pedal is desired than can be obtained by a rubber pedal-bar. The ends $j'$ of the serrated bars are bent at right angles to the central part or body of the bars, and are fitted between the ends of the rubber bars H and the end plates, G G'. The ends $j'$ of the bars J are provided with elongated openings $j^2$, through which the rods $i$ are inserted. The ends $j'$ extend below the edges of the end plates, G G', and are provided with hooks $j^3$, which fit against the outer edges of the end plates, G G', between the shoulders $k$ $k'$, formed on the end plates. The shoulders $k$ are rounded off, so that the hooks $j^3$ can be slipped over the shoulders when it is desired to turn the serrated edges of the bars J to one side of the pedal, and the shoulders $k'$ are made larger than the shoulders $k$, so that the hooks $j^3$ cannot be passed over the shoulders $k'$. The elongated holes $j^2$ in the ends $j'$ of the bars enable the hooks $j^3$ to be sprung over the shoulders $k$ by pressing the bars J into the rubber bars, and the pressure of the rubber bars against the under side of the serrated bars J retains the hooks $j^3$ between the shoulders $k$ $k'$. The space between the shoulders $k$ $k'$, being a trifle wider than the width of the hooks $j^3$, enables the bars J to be tipped slightly either way to properly fit the curve of the sole of the shoe, and the large shoulders $k'$ prevent the bars J from being turned outward under any pressure that may be applied. The pedal-bars can be readily turned on the rods $i$, and the pedals changed, so as to present to the foot of the rider either a rubber bar or a serrated steel bar, or a serrated bar on one end of the pedal and a rubber bar on the opposite end of the same pedal, as the rider may desire. When both serrated bars J J are turned inward toward the center sleeve, as shown in Figs. 2 and 3, the pedal can be used as a rubber pedal, and the pedal-frame may be swung around on the pedal-shaft, so as to present the lower or opposite faces of the rubber pedal-bars to the feet of the rider without bringing the serrated bars in position. By turning the serrated bar J upward on the front end of the pedal and downward on the rear or back end, as shown in Fig. 4, the pedal is transformed into a combined rubber and rat-trap pedal, the front bar being the rat-trap pedal-bar and the rear bar the rubber pedal, and when the serrated bars are in this position the pedal-frame may be swung around on the shaft A, so as to present the lower or opposite faces of the pedal-bars to the foot of the rider, and the serrated bar and rubber bar will assume the same relative position. The pressure of the foot, which is downward and forward upon the serrated bar when in this position, forces the hook $j^3$ against the shoulder $k'$, which prevents the bar from turning forward under the foot. The above positions will be found to be the ones most general in which the pedal will be used, and in either case the serrated bars J balance each other on opposite sides of the pedal-shaft. The serrated bars J may be provided with a single row of teeth, if desired; or they may be made apart from the rod $i$, and the rubber bars molded around with the teeth projecting through the bars. The rubber bars H, instead of being angular in cross-section, as shown in Figs. 3 and 4, may have their edges rounded, as shown in Fig. 10; or they may be rounded on one side and angular on the other.

$n$ represents the inner cone, formed near the inner end of the shaft A, and $n'$ the outer cone, formed on the outer end of the shaft. The cones $n$ $n'$ incline toward the opposite ends of the shaft, instead of toward its center, as they usually do.

$n^2$ represents the outer cone, formed in the end plate, G', opposite the outer cone, $n'$, on the shaft, and $n^3$ are the outer row of balls, which are interposed between the cones $n'$ $n^2$.

O represents a screw-threaded collar, which engages with an internal screw-thread formed in the opening $g$ of the inner end plate, G, and $p$ are the inner row of balls, which are interposed between the cone $n$ and the collar O. By turning the collar O on its screw-thread both the inner and outer cones and balls can be adjusted to their proper position without the employment of a projecting lock-nut at the outer end of the pedal. The outer edge of the collar O is provided with fine teeth or serrations O', which engage with the upper serrated face of a block or nut, L, whereby the collar O, when adjusted, is held in its proper position. The block L is secured to the end plate G by a screw-bolt, $l$, which is inserted through an elongated opening or slot, $l'$, formed in the plate G, and screws into the block L. The block L rests with its lower edge against a shoulder or ledge, $m$, formed on the outer edge of the end plate, G, and its upper edge projects through a slot, $g'$, formed in an annular rim or flange, $g^2$, which surrounds the opening $g$ of the end plate. By loosening the screw $l$, so that the block L will free the shoulder $m$, the block will drop and disengage itself from the nut O, and the latter is free to be adjusted in the opening $g$. The flange $g^2$ is provided with a slot, $g^3$, formed diametrically opposite the slot $g'$ above the collar O, whereby the latter can be readily turned and the bearings adjusted by means of a screw-driver or other tool inserted in the slot $g^3$ and pressing against the serrated edge of the collar O without removing the pedal from the crank. When the collar O has been properly adjusted, the block L is moved upward, so that the upper serrated edge will bear against the serrated edge O' of the collar and its lower edge rest upon the shoulder or ledge $m$, and by tightening the screw $l$ the block is held in this position and the collar O firmly locked.

The end plate, G, is provided with a shoulder or ledge, $m'$, and elongated hole $l^2$ on the upper side of the plate in line with the shoulder $m$ and opening $l'$ on the lower side, so that when the parts become worn on one side the pedal can be turned on the axle A, so as to present the lower faces of the pedal-bars to the foot of the rider without turning the bars on the rods $i$, and the pedal when so changed can be readily locked by the block or nut L and screw $l$ engaging in the elongated hole $l^2$ and shoulder $m'$. The weight of the block L and screw $l$ retains the pedal equally balanced, whereby the flat side of the pedal is always presented to the rider's foot, which is very desirable when making quick or difficult mounts.

$s$ represents a flat-headed screw, which is secured in a threaded hole formed in the center of the outer end plate, G', and $s'$ represents an oil-hole formed in the end plate on one side of the threaded opening and communicating with the inside of the sleeve F. The head of the screw $s$ is cut away on one side, as shown at $s^2$, so that when the cut-away portion $s^2$ is not opposite the opening $s'$ the head of the screw will close the opening $s'$.

To oil the pedal the screw $s$ is given a partial turn, so as to bring its cut-away portion $s^2$ opposite the oil-hole $s'$. When the parts have been sufficiently oiled, the screw is tightened, so that its head will close the opening $s'$, which effectually excludes the dust and confines the oil in the sleeve F. A similar oiling device may be applied to the center of the sleeve, if desired. The tapering form of the shaft A causes the oil to flow through the sleeve and lubricate the inner row of balls as well as the outer row.

In the modification shown in Figs. 10 and 11 the ball-bearings are omitted, and the rubber pedal-bars are secured between the end plates by the rods $i$, which are riveted to the end plates of the pedal.

The pedal-bars may be prevented from turning on the rods by cementing the ends of the bars to the end plates.

I claim as my invention—

1. The combination, with the pedal-frame provided with rubber bars H H, pivoted to the frame by rods $i$, of the serrated bars J, pivoted at their ends to the rods $i$ by slotted openings, and provided at their ends with hooks which engage over the sides of the pedal-frame to retain the serrated bars in position, substantially as set forth.

2. The combination, with the pedal-frame, of a rubber pedal-bar, H, provided with a central longitudinal groove, $h$, and two bearing-surfaces, $h'$ $h'$, on opposite sides of the groove $h$, substantially as set forth.

3. The combination, with the pedal-frame, of a rubber pedal-bar, H, pivoted to the frame by a rod, $i$, and provided on each of its sides with a longitudinal groove, $h$, and two bearing-faces, $h'\,h'$, on opposite sides of the groove, whereby the bar H is adapted to receive the pressure at its sides or edges and be compressed on opposite sides of the rod $i$, substantially as set forth.

4. The combination, with the pedal-shaft B, provided with a cone at each end, of a pedal-frame having a solid outer end and provided with a center sleeve, F, which receives the shaft, two rows of balls interposed between the sleeve and the shaft, and a collar, O, provided with a screw-thread engaging in a threaded opening formed in the inner end of the sleeve, whereby the pedal-frame is secured to the shaft and the balls are adjusted for wear, substantially as set forth.

5. The combination, with the pedal-shaft B, provided at its opposite ends with cones $n\,n'$, of a sleeve, F, inclosing the shaft B, and provided with end plates, G G', and outer cone, $n^2$, and balls interposed between the cones $n'$ and $n^3$ and between cone $n$ and collar O, the latter being provided with a screw-thread engaging in a threaded opening formed at the inner end of the sleeve, whereby the sleeve is secured to the shaft B and the balls are adjusted in the cones, substantially as set forth.

6. The combination, with the pedal-shaft and pedal-frame provided with a center sleeve, F, and end plate, G, of a block or nut, L, adjustably secured to either side of the end plate, G, and adapted to balance the pedal and cause the opposite side of the pedal to which the block L is secured to remain uppermost, substantially as set forth.

7. The combination, with the crank A and shaft B, secured in a slot formed in the end of the crank by a screw-nut, C, of a washer, D, arranged on the shaft between the crank and the nut C, and provided with a spring-arm, $d'$, and nut-lock E, secured to the arm $d'$, and adapted to engage against the nut C and prevent the latter from turning, substantially as set forth.

8. The combination, with the crank A, shaft B, and screw-nut C, provided with a serrated rim or flange, $c$, of a washer, D, secured to the shaft between the crank and nut C, and provided with a spring-arm, $d'$, and a nut-lock, E, hinged to the arm $d'$, and provided with a serrated edge adapted to engage with the serrated rim $c$ of the nut, substantially as set forth.

Witness my hand this 28th day of August, 1884.

EMMIT G. LATTA.

Witnesses:
  M. W. POTTER,
  FRED. H. RICE.